United States Patent
Guillet et al.

(10) Patent No.: US 12,497,322 B2
(45) Date of Patent: Dec. 16, 2025

(54) MELTING VITRIFIABLE MATERIAL WITH A BIOMASS-TYPE FUEL

(71) Applicant: SAINT-GOBAIN ISOVER, Courbevoie (FR)

(72) Inventors: Antoine Guillet, Paris (FR); Alexandru Vlad, Ploiesti-Prahova (RO)

(73) Assignee: SAINT-GOBAIN ISOVER, Courbevoie (FR)

( * ) Notice: Subject to any disclaimer, the term of this patent is extended or adjusted under 35 U.S.C. 154(b) by 466 days.

(21) Appl. No.: 17/792,330

(22) PCT Filed: Jan. 14, 2021

(86) PCT No.: PCT/FR2021/050061
§ 371 (c)(1),
(2) Date: Jul. 12, 2022

(87) PCT Pub. No.: WO2021/144536
PCT Pub. Date: Jul. 22, 2021

(65) Prior Publication Data
US 2023/0059556 A1 Feb. 23, 2023

(30) Foreign Application Priority Data
Jan. 15, 2020 (FR) ..................... 2000360

(51) Int. Cl.
| C03C 1/00 | (2006.01) |
|---|---|
| C03B 3/00 | (2006.01) |
| C03B 5/167 | (2006.01) |
| C03B 5/235 | (2006.01) |
| C03B 5/44 | (2006.01) |
| C03B 37/022 | (2006.01) |
| F27D 9/00 | (2006.01) |

(52) U.S. Cl.
CPC ............... *C03C 1/00* (2013.01); *C03B 3/005* (2013.01); *C03B 5/167* (2013.01); *C03B 5/2356* (2013.01); *C03B 5/44* (2013.01); *C03B 37/022* (2013.01); *F27D 9/00* (2013.01); *C03B 2211/23* (2013.01); *F27D 2009/0013* (2013.01)

(58) Field of Classification Search
CPC ....... C03B 5/167; C03B 3/005; C03B 5/2356; C03B 5/44; C03B 37/022; C03C 1/00; C03C 1/002; C03C 1/026
See application file for complete search history.

(56) References Cited

U.S. PATENT DOCUMENTS

| 9,163,187 | B2 | 10/2015 | Galley et al. | |
|---|---|---|---|---|
| 2004/0049094 | A1* | 3/2004 | Jeanvoine | F23G 7/10 405/129.27 |
| 2015/0065329 | A1* | 3/2015 | Cornejo | C03C 1/002 65/134.8 |
| 2018/0237322 | A1 | 8/2018 | Lewis | |
| 2018/0362380 | A1 | 12/2018 | Weil et al. | |

FOREIGN PATENT DOCUMENTS

| EP | 2 918 555 A1 | 9/2015 |
|---|---|---|
| FR | 2 987 617 A1 | 9/2013 |
| GB | 652467 A * | 4/1951 |
| JP | 2011-516679 A | 5/2011 |
| JP | 2015-511927 A | 4/2015 |
| JP | 2019-524625 A | 9/2019 |
| WO | WO 02/48612 A1 | 6/2002 |
| WO | WO 2013/117851 A1 | 8/2013 |
| WO | WO 2013/186480 A1 | 12/2013 |
| WO | WO 2018/026775 A1 | 2/2018 |

OTHER PUBLICATIONS

Bureau of Agricultural Economics, United States Department of Agriculture Statistical Bulletin No. 24, 1928, United States Government-Printing Office, pp. 1-90 (Year: 1928).*
International Search Report as issued in International Patent Application No. PCT/FR2021/050061, dated Jun. 2, 2021.
Notice of Reasons for Refusal as issued in Japanese Patent Application No. 2022-541293, dated Jan. 7, 2025.
Office Action as issued in Japanese Patent Application No. 2022-541293, dated Apr. 30, 2025.

* cited by examiner

*Primary Examiner* — Elizabeth A. Bolden
(74) *Attorney, Agent, or Firm* — Pillsbury Winthrop Shaw Pittman LLP

(57) ABSTRACT

A mixture of biomass and vitrifiable raw material for introducing into a fuel combustion furnace for the melting of a vitrifiable inorganic material, such as glass or rock or a silicate, includes an oleaginous biomass, the use of which reduces the damage to the equipment for metering and transporting the vitrifiable raw material.

20 Claims, 1 Drawing Sheet

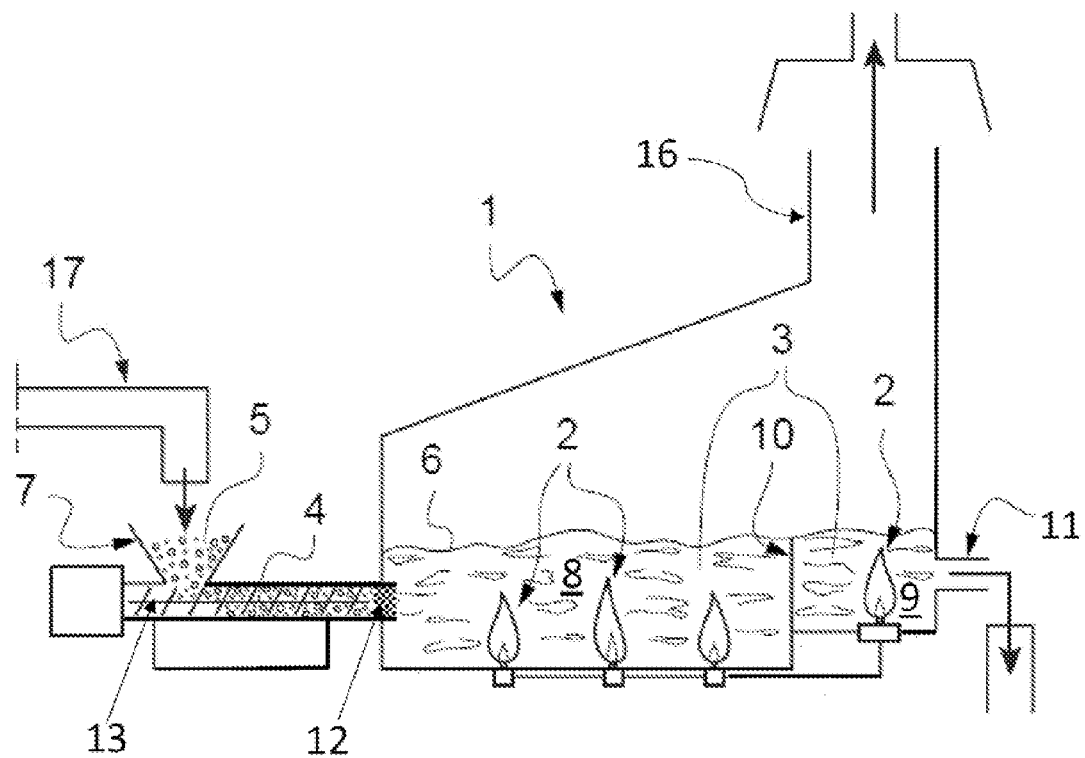

MELTING VITRIFIABLE MATERIAL WITH A BIOMASS-TYPE FUEL

CROSS-REFERENCE TO RELATED APPLICATIONS

This application is the U.S. National Stage of PCT/FR2021/050061, filed Jan. 14, 2021, which in turn claims priority to French patent application number 2000360 filed Jan. 15, 2020. The content of these applications are incorporated herein by reference in their entireties.

The invention relates to the field of the melting of a vitrifiable material, such as glass or rock or a silicate, in particular in the context of the manufacture of mineral wool.

The melting of a vitrifiable material comprises the introduction of vitrifiable raw material into a furnace and the heating of this raw material in the furnace until it melts. The high temperatures employed (generally greater than 1300° C.) subject the furnace and its fittings, the lifetime of which it is desired to extend as much as possible, to a severe test. This objective is easier to achieve if the temperature of the material being melted is thoroughly homogeneous in the furnace. Specifically, a homogeneous temperature of the molten mass makes it possible to minimize the temperatures necessary for the melting of the main part of the solid particles without creating excessively hot zones generating wear of the furnace and its fittings.

In the context of the invention, the heating in the furnace is carried out by combustion of fuel, biomass playing the role of fuel. It is not excluded for the biomass to also play the role of raw material influencing the composition of the vitrifiable material manufactured since its ash content is generally not zero. Biomass is an organic material of plant, animal, bacterial or fungal origin which can be used as an energy source.

The combustion of the fuel is obtained by virtue of the presence of an oxygen-comprising oxidizer, such as air or air enriched in oxygen or pure oxygen (that is to say, comprising more than 90%, indeed even more than 99%, of oxygen). Biomass is generally not the only fuel used, fuel of the gaseous or liquid hydrocarbon type, called hydrocarbon fuel, also being used. The hydrocarbon fuel and the oxidizer can be introduced separately into the furnace or be mixed in a burner mixing chamber before introduction into the furnace. The oxidizer and the fuel can be introduced above the surface of the material being melted or below the surface of the material being melted. The furnace can comprise walls cooled by a stream of water. The furnace can in particular be a submerged combustion furnace. This furnace can in particular comprise metal walls cooled by circulation of water (furnace called "water jacket" by a person skilled in the art) and comprise one or two successive tanks, as described in WO2013186480. For the combustion of the hydrocarbon fuel, the furnace can be equipped with submerged burners, in particular with burners each comprising a plurality of in-line injectors, as described in WO2013117851.

The invention relates to a process for the melting of a vitrifiable inorganic material, such as glass or rock or a silicate, comprising the introduction of a preconstituted mixture of vitrifiable raw material and biomass into a fuel combustion furnace, then the heating of said mixture leading to the melting of the vitrifiable material. The mixture of raw material and biomass is preconstituted, which means that it is prepared prior to its introduction into the furnace, and not formed in situ in the furnace by separate introduction. It is, of course, not excluded to also introduce raw material and/or biomass separately.

Several beneficial effects resulting from the introduction of biomass have been noticed:

- the temperature in the furnace is much more homogeneous; this is undoubtedly due to the fact that the biomass is distributed in the furnace uniformly, in the same way as the raw material, and it thus plays its role of fuel in any zone of the furnace; the combustion is then not limited only to the burners, which usually tend to form very hot zones; it is thus possible to reduce the power of the burners in order to replace it in part by the power originating from the combustion of the biomass, this power being diffused throughout the furnace; by virtue of this, the use of biomass provides great stability in temperature and output;
- the presence of biomass in the preconstituted mixture prevents the premature formation of agglomerates under the effect of heat when the mixture approaches the point of introduction into the furnace; specifically, this type of agglomerate can form a true plug obstructing the channel for introduction of the raw material, which then causes an interruption in production; this type of agglomerate appears to be a mixture of molten and nonmolten material, and forms a little like sintering; the presence of the biomass disrupts the formation of agglomerates, perhaps under the effect of the decomposition of the biomass with the formation of gas, and the raw material can then be distributed as soon as it is introduced into the furnace in a rapid and very homogeneous manner.

Advantageously, the preconstituted mixture is introduced into the furnace under the surface of the materials being melted. Thus, the most volatile material (raw material or biomass) is trapped in the molten mass and cannot escape via the combustion flue gases. A submerged combustion furnace provides very efficient mixing of all the materials contained in the furnace. The preconstituted mixture introduced under the surface of the molten materials is immediately mixed with everything which the furnace contains and is diffused throughout the furnace.

The preconstituted mixture is introduced into the furnace by flow or pushing, such as by use of an endless screw or a piston. In the case of the introduction under the surface of the molten materials, a plug forms as the point of introduction into the furnace is approached. This plug is a mixture of mass of congealed inorganic material (glass or rock or silicate) originating from the furnace, mixed with incoming raw material. This plug forms at a place where the temperature varies strongly between the hot interior of the furnace and the cold exterior of the furnace. This temperature gradient is even stronger in the case of a furnace of the "water jacket" type. The formation of this plug is beneficial because it prevents the molten mass in the furnace from escaping from it to enter the sleeve containing the endless screw. However, if this plug is too viscous, it risks strongly braking or even blocking the screw, and the application of too high a driving torque to the screw to make it turn in spite of everything can lead to it breaking. The presence of biomass mixed with the raw material reduces the viscosity of the plug. The invention is particularly suitable for the melting of an inorganic material in a submerged combustion furnace comprising walls cooled by a stream of water, the vitrifiable raw material being introduced into the furnace mixed with biomass, under the surface of the materials being melted.

The invention also relates to a mixture of biomass and vitrifiable raw material for introducing into a furnace for the melting of a vitrifiable inorganic material, in particular of glass or rock or silicate. This mixture is formed before its introduction into the furnace. In this mixture, the biomass generally represents from 1% to 50% by weight and preferably from 10% to 40% by weight of the mass of the mixture.

The biomass can be a plant, such as miscanthus or an algae. A particularly effective biomass comprises oleaginous seeds and/or seed husks of oleaginous seeds, called oleaginous biomass. Oilseeds are plants cultivated for their seeds or their fruits rich in fatty substances, the oil of which is extracted for food, energy or industrial use. Oleaginous biomass is in particular seeds or seed husks of at least one following plant species: sunflower, rapeseed, soybean, palm, peanut, olive or squash, in particular sunflower hulls. The term "seed husk" denotes that which surrounds and protects the seed itself and can, depending on the plant species, be a pod, shell, skin, and the like. The excellent behavior of oleaginous biomass is attributed to the fact that it is fatty. It acts as a true lubricant, not only for an endless screw, but also for the entire mechanical system conveying the mixture to the furnace. The presence of biomass therefore acts as prevention of damage to the equipment for metering and transporting the vitrifiable raw material. The invention also relates to the use of an oleaginous biomass in addition with vitrifiable raw material for the purpose of reducing the damage to the equipment for metering and transporting said vitrifiable raw material. A particularly effective oleaginous biomass is sunflower hulls, which are in addition an inexpensive waste from the food-processing industry. The use of this byproduct is thus particularly advantageous and even ecological because it is a nonfossil fuel with which it is not known what to do, because it is inedible (either for human food or for animal feed) and does not require any specific crop taking the place of another for human consumption. The oleaginous biomass can represent more than 50% and preferably more than 80% and preferably more than 90%, indeed even 100%, by weight of the biomass.

In order to demonstrate the beneficial effect of the introduction of an oleaginous biomass on the lifetime of a batch charger, two series of tests are carried out on a pilot furnace having a submerged burner. According to a first series called "without biomass", a composition of vitrifiable materials not containing biomass is introduced into the furnace. According to a second series called "with biomass", a biomass of oleaginous type, consisting of sunflower seed hulls, is introduced into the composition of vitrifiable materials, in a proportion of 100 kg of biomass per 1300 kg of vitrifiable materials, i.e. approximately 7.7% by weight. The other process parameters (temperature of the glass bath, charging flow rate by weight, and the like) remain unchanged between the two series. For each test, the respective lifetimes of the charging screw and the sleeve are noted. The mean values of these lifetimes are shown in table 1 below.

TABLE 1

|  | Mean duration of the screw (in days) | Mean duration of the sleeve (in days) |
| --- | --- | --- |
| Without Biomass | 23.25 | 37.7 |
| With Biomass | 157 | 84 |
| Increase in % | 575% | 123% |

Mean Values of Screw and Sleeve Lifetime of Batch Chargers Depending on the Compositions of Vitrifiable Materials Charged The results of table 1 show that the introduction of an oleaginous biomass of sunflower seed hulls, even in a relatively small proportion of 7.7% by weight, makes it possible to significantly increase the lifetime of the batch charger, bringing about a mean increase of 575% in the lifetime of the charging screw and of 123% in the lifetime of the sleeve.

The biomass is a fuel in the same way as the hydrocarbon fuel supplied to the burners. The amount of oxidizer introduced into the furnace, generally by the burners, is suitable for incinerating all the fuel introduced into the furnace. More oxidizer is thus supplied to the burners than is necessary to incinerate the hydrocarbon fuel supplied to the burners, the excess oxidizer serving to incinerate the biomass supplied outside the burners.

The biomass can provide from 5% to 80% of the net calorific value of the total fuel used to heat the furnace.

The molten material in the furnace generally has a temperature of between 1200° C. and 1700° C.

The vitrifiable material manufactured by the process according to the invention is an inorganic material, generally of the oxide type, generally comprising at least 30% by weight of silica, such as a glass or a rock or a silicate, for example an alkali metal and/or alkaline earth metal silicate.

A glass or a rock generally comprises:
  $SiO_2$: 30% to 75% by weight,
  CaO+MgO: 5% to 40% by weight,
  $Na_2O+K_2O$: 0% to 20% by weight,
  $Al_2O_3$: 0% to 30% by weight,
  Iron oxide: 0% to 15% by weight.

If a glass is targeted, then the composition of the vitrifiable material manufactured generally comprises:
  $SiO_2$: 50% to 75% by weight,
  CaO+MgO: 5% to 20% by weight,
  $Na_2O+K_2O$: 12% to 20% by weight,
  $Al_2O_3$: 0% to 8% by weight,
  Iron oxide: 0% to 3% by weight,
  $B_2O_3$: 2% to 10% by weight.

If a rock (also called "black glass" by a person skilled in the art) is targeted, then the composition of the vitrifiable material manufactured generally comprises:
  $SiO_2$: 30% to 50% by weight,
  CaO+MgO: 20% to 40% by weight,
  $Al_2O_3$: 10% to 26% by weight,
  Iron oxide: 3% to 15% by weight.

A preconstituted mixture of biomass and vitrifiable raw material is introduced into the furnace. The vitrifiable raw material introduced into the furnace contains the compounds making it possible to obtain the targeted inorganic composition (glass or rock or silicate), it being possible for these compounds to be those usually used by a person skilled in the art, such as sand (source of silica), an alkali metal oxide or hydroxide or carbonate, an alkaline earth oxide or hydroxide or carbonate, feldspar (source of alumina), and the like. The vitrifiable raw material generally comprises silica and at least one of the following compounds: alkali metal oxide or hydroxide or carbonate, alkaline earth oxide or hydroxide or carbonate. The raw material can also comprise cullet. The raw material is generally a mixture of powder, or a mixture of powder and pieces of cullet. The expression "the raw material" is thus a generic expression denoting generally a mixture comprising various pulverulent compounds. This "raw material" is vitrifiable, its melting leading to an inorganic material of the glass or rock or silicate type.

The molten vitrifiable inorganic material manufactured according to the invention is extracted from the furnace in order to be solidified by cooling in a suitable form. In particular, it can be extracted from the furnace in the molten state to be used directly in a fiberizing device in order to form reinforcing strands or mineral wool. Thus, the vitrifiable inorganic material can be extracted from the furnace and transformed into fiber in a fiberizing device. In the fiberizing application, the vitrifiable material is generally glass or rock.

FIG. 1 diagrammatically represents a furnace having submerged burners which can be used in the context of the invention, seen in section and from the side. A furnace 1 comprising burners 2 submerged in vitrifiable materials 3 during melting is displayed. An endless screw 13 pushes a mixture 5 of raw material and biomass under the surface 6 of the molten material in the furnace. A dispenser 17 of the mixture feeds a feed hopper 7, which subsequently feeds an endless screw 13 rotating in a sleeve 4. A more or less viscous plug 12, a mixture of congealed material and of raw material, tends to form at the end of the sleeve 4, as the temperature of the molten mass is approached. The interior of the furnace includes two tanks 8 and 9 operating on the principle taught in WO2013186480. The endless screw first feeds the tank 8 at relatively low temperature, then the melted vitrifiable material formed overflows above the partition 10 to pass into the tank 9, the temperature of which is higher than that of the tank 8. The vitrifiable material formed exits through the outlet 11 below the level of the molten materials. The combustion gases escape through a chimney 16.

The invention claimed is:

1. A mixture consisting essentially of biomass and vitrifiable raw material for introducing into a furnace for the melting of a vitrifiable inorganic material, wherein the biomass comprises oleaginous seeds and/or seed husks of oleaginous seeds forming an oleaginous biomass.

2. The mixture as claimed in claim 1, wherein the biomass represents from 1% to 50% by weight of the mass of the mixture.

3. The mixture as claimed in claim 1, wherein the oleaginous biomass represents more than 50% by weight of the biomass.

4. The mixture as claimed in claim 2, wherein the oleaginous biomass is seeds or seed husks of at least one following plant species: sunflower, rapeseed, soybean, palm, peanut, olive or squash.

5. The mixture as claimed in claim 1, wherein the vitrifiable raw material comprises silica and at least one of the following compounds: alkali metal oxide or hydroxide or carbonate, alkaline earth oxide or hydroxide or carbonate.

6. A process for the melting of a vitrifiable inorganic material comprising introducing a preconstituted mixture of claim 1 into a fuel combustion furnace, then heating said mixture leading to melting of the vitrifiable inorganic material.

7. The process as claimed in claim 6, wherein the furnace is a submerged combustion furnace.

8. The process as claimed in claim 6, wherein the preconstituted mixture is introduced into the furnace under a surface of the materials being melted.

9. The process as claimed in claim 6, wherein the preconstituted mixture is introduced into the furnace by flow or pushing.

10. The process as claimed in claim 9, wherein the introduction of the preconstituted mixture is carried out by pushing by an endless screw.

11. The process as claimed in claim 6, wherein the biomass provides from 5% to 80% of a net calorific value of the fuel.

12. The process as claimed in claim 6, wherein the molten material in the furnace has a temperature of between 1200° C. and 1700° C.

13. The process as claimed in claim 6, wherein the vitrifiable inorganic material is extracted from the furnace and transformed into fiber in a fiberizing device.

14. The process as claimed in claim 6, wherein the furnace comprises walls cooled by a stream of water.

15. A method comprising providing a mixture consisting essentially of an oleaginous biomass in addition with vitrifiable raw material for the purpose of reducing damage to an equipment for metering and transporting said vitrifiable raw material, wherein the oleaginous biomass comprises oleaginous seeds and/or seed husks of oleaginous seeds forming an oleaginous biomass.

16. The mixture as claimed in claim 2, wherein the biomass represents from 10% to 40% by weight of the mass of the mixture.

17. The mixture as claimed in claim 3, wherein the oleaginous biomass represents more than 90% by weight of the biomass.

18. The mixture as claimed in claim 17, wherein the oleaginous biomass represents 100% by weight of the biomass.

19. The mixture as claimed in claim 4, wherein the oleaginous biomass is sunflower hulls.

20. The process as claimed in claim 6, wherein the vitrifiable inorganic material is glass or rock or a silicate.

* * * * *